Figure 1:
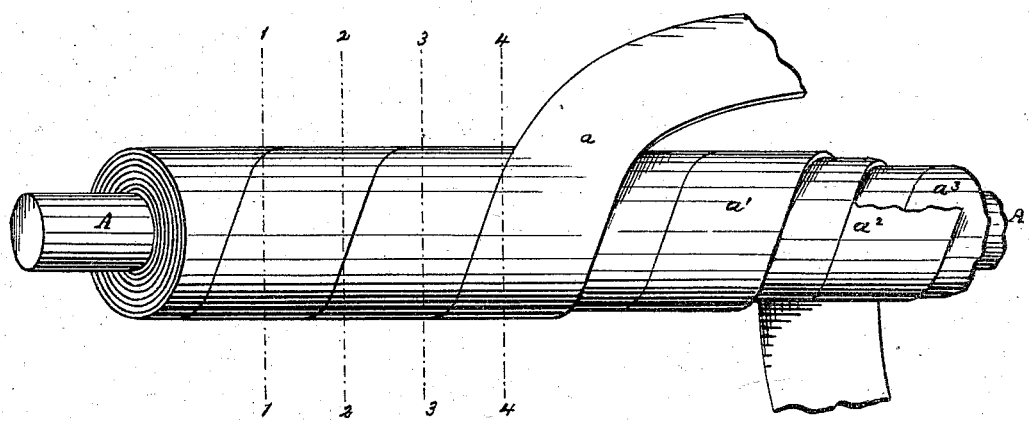

T. J. MAYALL.
Piston-Packings.

No. 143,705. Patented Oct. 14, 1873.

Witnesses. Inventor.

UNITED STATES PATENT OFFICE.

THOMAS J. MAYALL, OF BOSTON, MASSACHUSETTS.

IMPROVEMENT IN PISTON-PACKINGS.

Specification forming part of Letters Patent No. 143,705, dated October 14, 1873; application filed June 17, 1873.

*To all whom it may concern:*

Be it known that I, THOMAS J. MAYALL, of Boston, Suffolk county, Massachusetts, have invented certain new and useful Improvements in the Manufacture of Packing for Pistons, Piston-Rods, and Steam-Joints, and for other purposes, of which the following is a specification:

This invention relates to packing for steam-joints and other uses, composed in the main of canvas or other woven fabric.

I shall proceed at once to describe what I consider to be the best manner of carrying into effect my improvements in the manufacture of this packing, and will afterward state what I believe to be the important features of my invention.

I take canvas, duck, or other suitable woven fabric, preferably hemp canvas, and draw it slowly over a steam-table, during its progress over which it is treated with bees-wax, either by pouring on it the bees-wax in a melted condition, or by rubbing it with bees-wax in the lump, care being taken to leave no part of the surface of the canvas untouched by the wax. One or both sides of the canvas may be thus coated; I much prefer, however, to coat both sides, and, in fact, to thoroughly saturate the canvas with the wax. After this operation I then treat the waxed canvas with "rubber solution," which may consist of ground, washed, or prepared rubber, thinned with naphtha, the proportion of naphtha to the rubber being according to the thickness desired for the solution. For ordinary purposes I use six or eight gallons of naphtha to eight pounds of rubber, which will give a solution of about the consistency of molasses.

The manner of applying the solution may be varied. I prefer to use for the purpose what is known in rubber manufacture as the "knife-machine," or the "proofing-machine," in which the canvas moves along under and in contact with a slanting knife or scraping blade, placed transversely to the direction in which the canvas moves, the rubber solution being poured onto the canvas in advance of the knife, which will thus scrape off and remove all superfluous solution from the canvas as it passes along. The solution can, however, be applied to the canvas by a brush, or by other well-known or suitable means. Both sides of the canvas are preferably treated with the solution.

The preliminary treatment with bees-wax or its equivalent is for the purpose of saturating or filling the duck or canvas with a lubricant; the subsequent treatment with rubber solution is for the purpose of providing a material which will cause the layers of canvas, when put together to form a packing, to adhere to one another, and which will also serve to hold the bees-wax or other lubricant in the canvas, and prevent its being given off too freely.

The canvas thus prepared is put up in the way which I shall now proceed more particularly to describe by reference to the accompanying drawing, in which—

Figure 2:
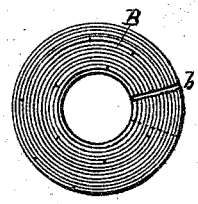
Figure 3:

Figure 1 is a perspective view of the packing as it appears on the mandrel before being cut up into suitable lengths. Fig. 2 is an end view of one of the packing-rings cut from such tubular packing, as shown in Fig. 1; and Fig. 3 is an elevation of the same.

The canvas is cut up into strips of proper width, say between two and three inches, and of any desired length. The cutting is done in lines parallel, or substantially so, with either the warp or weft threads, according as the canvas is divided, crosswise or lengthwise. A mandrel, A, of requisite length is provided, upon which one of the strips is wound spirally from end to end, the contiguous edges of the spiral folds of the strip just meeting, or perhaps slightly overlapping, each other. Upon this spirally-wound strip another canvas layer, consisting of a second spirally-wound strip, is laid, care being taken to so wind this second strip that it shall break joint with the first. Upon the second strip a third is wound, and so on until the desired number of layers has been attained. This operation can be done by hand, or in a lathe running at a low speed. The strips should be wound tightly in either case. In Fig. 1 the layers are represented as partly broken away at one end of the mandrel, as indicated at $a$ $a^1$ $a^2$, &c. In this manner a tube of packing of any desired length can be obtained; and it will be noticed that the threads of the canvas run spirally from end to end of the tube. This tube is now cut into desired lengths, as indicated by the lines 1 2 3 4, the lines of division being at right angles with the axis of the tube. This mode of division, in connection with the previous spiral winding and the position of the threads of the canvas, causes the fabric in the rings thus cut to be bias, which is very desirable in all cases, and, indeed, indispensable in packing composed of layers of closely-woven canvas, which must be bent or sprung around a rod or into a stuffing-box. One of the packing-rings cut from the tube is represented at B in Figs. 2 and 3. In order to fit this packing-ring to the rod for which it is designed, it is split, as shown at $b$, and then can be opened and sprung onto its rod.

The above mode of manufacture is convenient and of advantage on many accounts. A packing is produced in which the layers are disposed to the best advantage, and it can be readily made of any dimensions to adapt it to any special size of stuffing-box and rod. For instance, if the diameter of the piston-rod and the internal diameter of the stuffing-box be stated by the person ordering packing for such rod and box, then in making the packing the canvas strips would be wound on a mandrel of the diameter of the rod, and a sufficient number of layers would be wound on to give the tube an external diameter equal to, or slightly less, than the internal diameter of the stuffing-box. The tube thus produced could be cut off into rings of requisite length to suit the depth of the box. Even if the rings should be greater in diameter than the box, this could be readily corrected, for the ring is composed of separate and independent layers, one or more of which might be stripped off until the ring should be reduced to the proper dimensions. In the same way the diameter of the bore of the ring can be varied.

By this process of manufacture—involving the preliminary treatment of the canvas, first, with bees-wax or other lubricant, and then with rubber solution, and its subsequent putting up upon the mandrel in independent and separate layers formed of spirally-wound strips—a packing is obtained combining all the advantages above enumerated, and constituting as a whole an article superior to any other now in the market. I wish it to be understood, however, that the aforesaid preliminary treatment, first with the lubricant and then with rubber solution, may be applied with advantage to canvas made into packing in a manner different from that herein indicated, and also that the mode described of putting up or constructing the packing-rings can be employed for canvas treated otherwise than hereinbefore described.

Having now described my invention, and the manner in which the same is or may be carried into effect, what I claim, and desire to secure by Letters Patent, is—

1. Packing for pistons, piston-rods, steam-joints, and other uses, made of canvas or other fabric, treated first with beeswax or other lubricant, and then with rubber solution, substantially as and for the purposes herein described.

2. The mode described of putting up the prepared fabric, the same consisting in dividing said fabric into strips, the longer edges of which are parallel with the warp or weft threads, as the case may be, and winding said strips spirally upon a mandrel or form in successive separate and independent layers, breaking joint with one another, as herein shown and set forth.

In testimony whereof I have signed my name in the presence of two subscribing witnesses.

THOS. J. MAYALL.

Witnesses:
JOHN BULKLEY,
EDM. F. BROWN.